United States Patent [19]

Kurtenbach

[11] Patent Number: 5,926,178
[45] Date of Patent: Jul. 20, 1999

[54] DISPLAY AND CONTROL OF MENUS WITH RADIAL AND LINEAR PORTIONS

[75] Inventor: Gordon P. Kurtenbach, Toronto, Canada

[73] Assignee: Silicon Graphics, Inc., Mountain View, Calif.

[21] Appl. No.: 08/840,725

[22] Filed: Apr. 1, 1997

Related U.S. Application Data

[63] Continuation of application No. 08/469,913, Jun. 6, 1995., Pat. No. 5,689,667
[51] Int. Cl.$^6$ .......................................................... G06F 3/00
[52] U.S. Cl. ............................ 345/352; 345/353; 345/146
[58] Field of Search .................................... 345/326–358, 345/146, 145

[56] References Cited

U.S. PATENT DOCUMENTS

| | | | |
|---|---|---|---|
| 5,303,388 | 4/1994 | Kreitman et al. | 345/349 |
| 5,500,935 | 3/1996 | Moran et al. | 345/352 |
| 5,524,196 | 6/1996 | Blades | 345/353 |
| 5,559,944 | 9/1996 | Ono | 345/353 |
| 5,596,699 | 1/1997 | Driskell | 345/352 |
| 5,617,114 | 4/1997 | Bier et al. | 345/146 X |
| 5,701,424 | 12/1997 | Atkinson | 345/353 |
| 5,721,853 | 2/1998 | Smith | 345/353 |

OTHER PUBLICATIONS

Foley et al., "Computer Graphics: Principles and Practice", Addison–Wesley, pp. 364–367, Nov. 1993.
Gordon P. Kurtenbach, "An Empirical Evaluation of Some Articulatory and Cognitive Aspects of Marking Menus", *Human–Computer Interaction*, 1993, vol. 8, pp. 1–23.
Gordon Kurtenbach and William Buxton, "The Limits Of Expert Performance Using Hierarchic Marking Menus", INTERCHI '93, Apr. 24–29, 1993, pp. 482–487.
G. Kurtenbach, T.P. Moran and W. Buxton, "Contextual Animation of Gestural Commands", Computer Graphics forum, vol. 13, (1994) No. 5, pp. 305–314.
Don Hopkins, "The Design and Implementation of Pie Menus", Dr. Dobb's Journal, Dec. 1991, pp. 16, 18, 22, 26.
Gordon Paul Kurtenbach, "The Design and Evaluation of Marking Menus", 1993, pp. 1–173.
Gordon Kurtenbach and William Buxton, "User Learning and Performance with Marking Menus", Human Factors in Computing Systems CHI '94, Apr. 24–28, 1994, pp. 258–264.
LaLonde et al, "Pie Menus", JOOP, V. 2, N. 1, May/Jun. 1989, pp. 47–54.
Callahan et al., "An Empirical Comparison of Pie v. Linear Menus", ACM, 1988, pp. 95–100, (with illustrations).
Hopkins et al., "Pies Implementation, Evaluation, and Application of Circular Menus", UMCS Dept. tech. report, 1988, pp. 1–25.

*Primary Examiner*—John E. Breene

[57] ABSTRACT

A menu may be displayed combining a radial marking menu portion and a linear menu portion. Item selection in the linear portion is performed by location selection using a pointing device. Item selection in the marker portion is determined by the pattern of a stroke made by the pointing device with the system ignoring linear menu items across which the stoke completely passes. Linear menu items may be non-hierarchically related to the radial items. Linear and radial portions may be simultaneously produced on a display based on a single input event.

2 Claims, 9 Drawing Sheets

LINEAR MENU

DISPLAY AND CONTROL OF MENUS WITH RADIAL AND LINEAR PORTIONS

This application is a continuation of application Ser. No. 08/469,913, filed Jun. 6, 1995, now U.S. Pat. No. 5,689,667.

BACKGROUND OF THE INVENTION

1. Field of the Invention

The present invention is directed to a method and apparatus for producing, controlling and displaying menus that combine radial marking menus and linear menus and, more particularly, to a system that combines a pattern selectable menu with a location selectable menu into a single display.

2. Description of the Related Art

Menus selection in modern user interfaces is a fundamental and frequently used operation. In general, the length of time it takes to select from a menu is small (seconds or fractions of second). However, because menu selection is a high frequency operation in some types of applications, reducing the time involved in selecting from a menu can result in significant time savings in the overall time it takes to accomplish a larger task. It is for this very reason that menu selection speed up ("accelerator") techniques like "hot keys" and marking menus are popular.

Each accelerator technique has its own advantages and disadvantages. For example, hot keys can select from a large set of menu items, for example, every key on the keyboard can be used as hot key. However, this is at the cost of the user remembering the associations between menu items and keys. Hot keys are also not effective if a user is working on a system that does not include a keyboard or the user must move between the keyboard and another device while operating the interface. For example, the user may have to move the same hand from a mouse, to the keyboard, and then back to the mouse.

Marking menus is a pop up menu technology that displays menu items in a circle, around the cursor whereas traditional menus (linear menus) display menu items in a linear fashion, for example, from top to bottom. Because of this difference, item selection can be performed more rapidly with marking menus than with linear menus. For example, a user can select from marking menus by "flicking" or making a stroke of the cursor in the direction of a desired menu item. Thus, the user does not have to wait for the menu to be displayed to select from it. However, as the number of items in a marking menu increases, rapid selection without popping up the menu becomes difficult because the angular difference between menu items becomes small and difficult for the user to articulate. To combat this problem, the number of items in a marking menus is generally limited to eight or less.

What is needed is a combination of a radial marking menu and a linear menu in the same display such that the number of items in the menu can be increased beyond eight items while still permitting rapid selection for the items of the marking menu using a marking or stroke pattern and selection of the items of the linear menu using a locational method.

SUMMARY OF THE INVENTION

It is an object of the present invention to combine radial marking menus with linear menus in the same display.

It is another object of the present invention to combine marking menu selection techniques with location selection techniques.

It is an additional object of the present invention to provide a menu display in which selection of some items are accelerated.

It is also an object of the present invention to provide a process that distinguishes between linear (or location) based menu selection and pattern-based menu selection.

The above objects can be attained by a system that combines a radial marking menu, in which item selection is performed by marking a menu item with a cursor mark, with a linear menu, in which item selection is performed by selection at a particular location. The system distinguishes between parts of the display in which the linear menu is located and parts of the display in which the radial marking menu is located.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
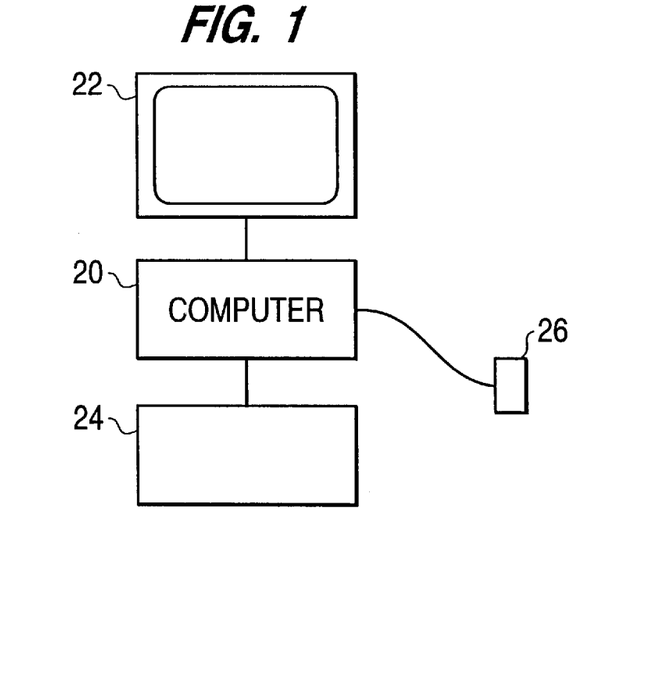
FIG. 1 illustrates typical hardware of the present invention.

The present invention typically has a hardware configuration, as illustrated in FIG. 1, that includes a computer 20 which generates and displays menus on a display 22. A user interacts with the display 22 through the computer system 20 using an interface device, such as a keyboard 24, and a pointing device 26, such as a mouse. The computer 20 includes the conventional hardware necessary to interact with a pointing device 26, such as motion detection circuits and button depression detection circuits, and the appropriate storage media, such as a hard disk or a floppy disk on which the process discussed herein is stored. The computer 20 can be any type of computer from a personal/portable computer to a main frame computer with the typical computer being a workstation type computer that is used for high volume production operations in which menu selection is a significant portion of the operations performed by a user, such as in CAD/CAM and animation operations. The display 22 can also be any type of display that is capable of displaying a menu, such as a CRT display or a liquid crystal display. The pointing device 26 can be any type of pointing device including a pen, a mouse, a track ball, a track point or a joy stick, either separate from or part of the keyboard 24. The display 22 and pointing device 26 can also be combined into a single device, such as touch sensitive screen.

The present invention combines a radial marking menu with a linear menu into a single display where the radial and linear portions are associated with each other and displayed simultaneously. The present invention allows the menus to be selected using the pattern and location techniques of these two types of menus. The selection and display arrangement of linear and radial menus will be discussed before discussing their combination.

Figure 2:
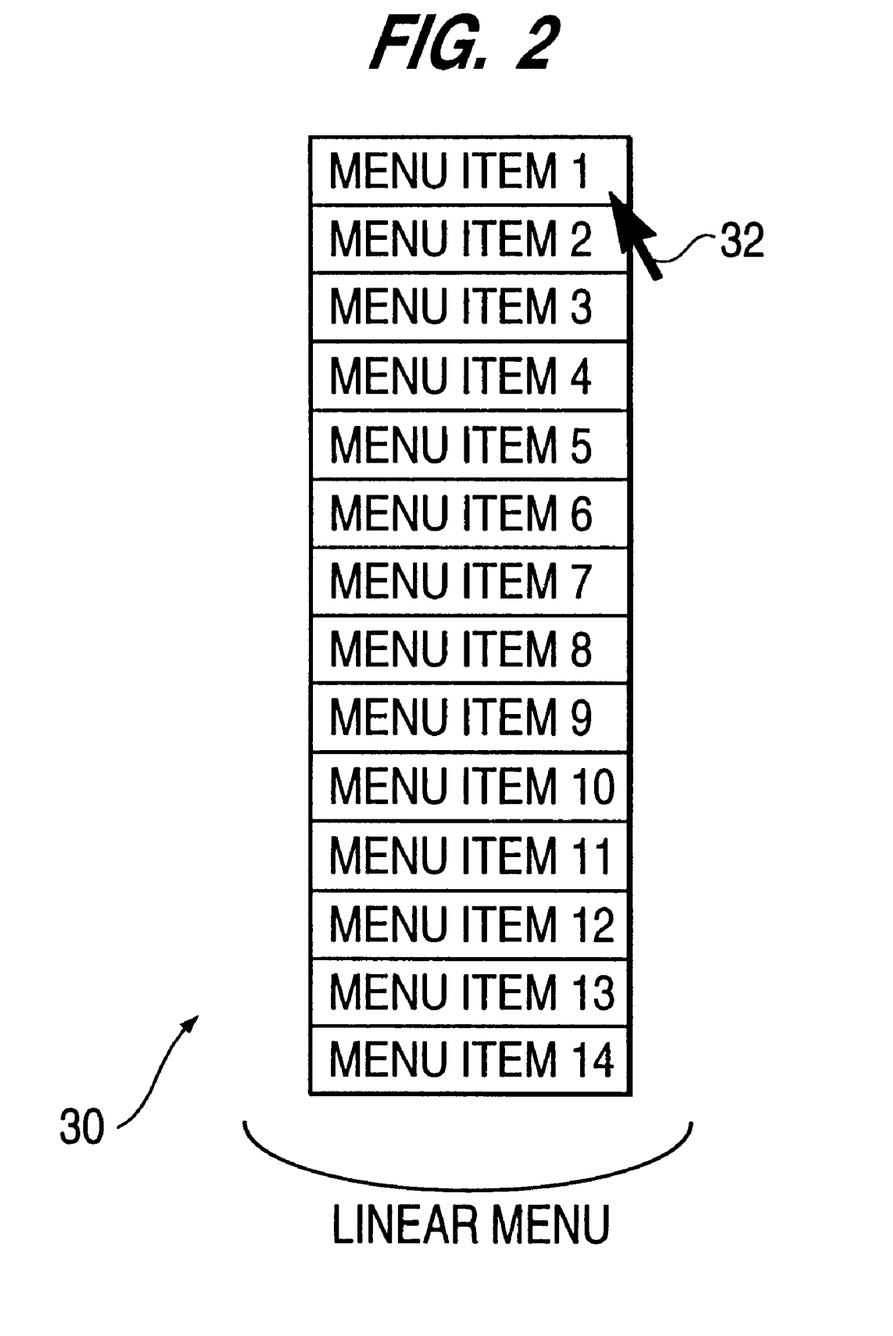
FIG. 2 illustrates a linear or location selection type menu.

A linear menu 30, as illustrated in FIG. 2, is typically a linear array of menu items where the number shown in FIG. 2 is fourteen items (1–14) but where the array shown is a single dimensional array. The number of items can, of course, be less than or greater than 14 and the items can be arranged in two or more dimensions or even in an arbitrary arrangement. The main feature of a linear menu is the way in which it is used to select a desired item. Typically, a pointer (or cursor) 32, such as an arrow as shown, is moved to the location or area defined by the menu item desired to be selected by manipulating the pointing device 26 and the selection is made by depressing (or releasing) a button that is typically associated with the pointing device 26 but which could be in a separate interface device, such as the keyboard 24. The computer 10 determines the location of the pointer 32 at the time the button is depressed (or released) and if the pointer is within the area defined by a menu item, that item is selected. If the pointer is not within any areas defined by menu items nothing is selected. That is, linear menus use the location of the pointer 32 to determine the item selected. If the user depresses (or releases) the selection button while the pointer 32 is positioned over Menu Item 1, as shown in FIG. 2, Menu Item 1 would be selected. Using a linear menu requires that the user position the pointer 32 in the area of the display defined by the item to be selected. This can take a considerable amount of time for the user and accurate positioning is required. The accurate positioning is even more critical when the item is an icon that can be rather small.

Figure 3:
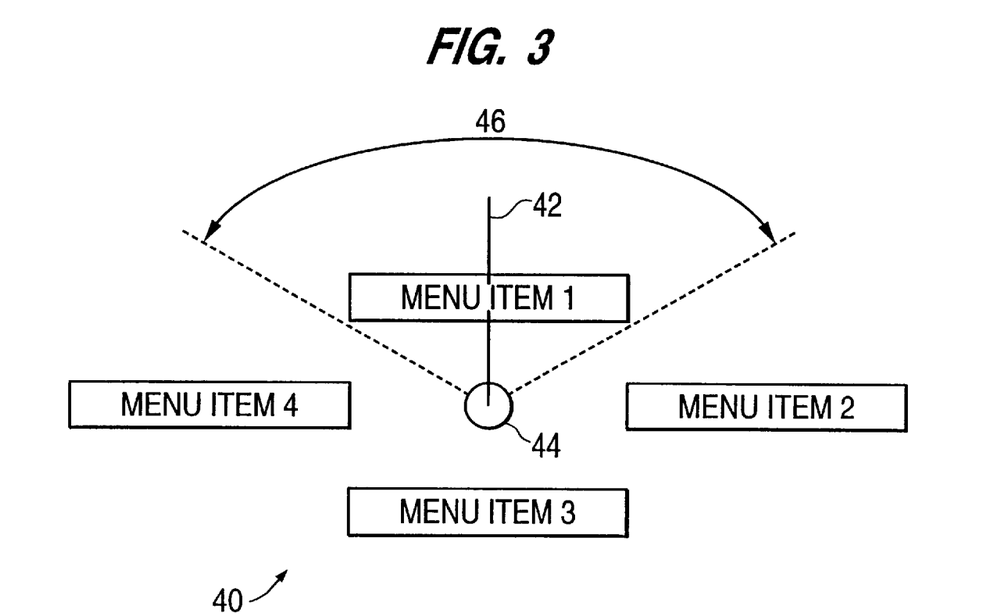
FIG. 3 illustrates a radial marking type menu.
Figure 4:
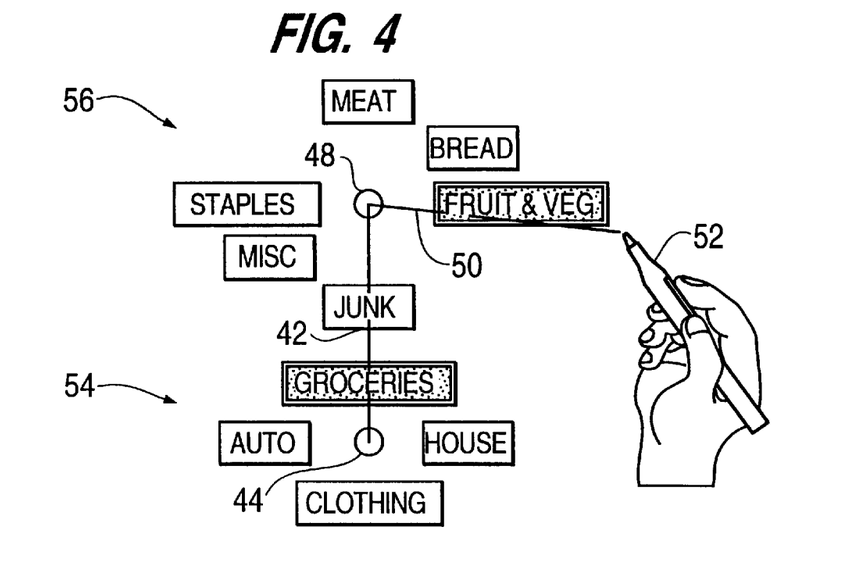
FIG. 4 illustrates submenu selection using a marking menu.

Radial menus include two types: pie menus and marking menus. Pie menus are typically used in item selection using the location principles of linear menus as discussed above. Marking menus operate on the principle of the direction of cursor or pointer motion as being the basis for item selection. Marking is a menu selection operation which works as follows. A user activates the selection indicator of the pointing device 26, such as by pressing down on the screen with a pen or holding down the button on a mouse and waits for a short interval of time (approximately ⅓ second). A radial menu 40, such as illustrated in FIG. 3, then appears ("pops-up") directly under the tip of the pen 52. A user then highlights an item by keeping the pen pressed and making a stroke 42 towards the desired item. The stroke 42 is created by the computer constantly redrawing a straight line between the center 44 of the menu 40 and the current location of the pointer (that is, the stroke 42 behaves like a "rubber band line" between the center of the menu and the pointer). The computer 20 highlights a particular item when the pointer moves into the angular range associated with that menu item (for example, angle range 46, associated with Menu Item 1 in FIG. 3). If the item has no sub-menu, the highlighted item can be selected by lifting the pen. If the item does have a sub-menu, and the user stops moving the pointer, the submenu is displayed with the center 48 of the new menu under the pen 52 (see FIG. 4). The user then continues, from the new center 48, selecting the newly displayed sub-menu by providing another stroke 50 with the pen 52. Lifting the pen 52 will cause the current series of highlighted items to be selected. In the example of FIG. 4 the items selected are "Groceries" in the main menu 54 and "Fruit & Veg" in the submenu 56. The menus are then removed from the screen. At any time a user can indicate "no selection" of the submenu 56 by moving the pen back to the center (48) of the submenu before lifting, or change the selection by moving the pen to highlight another item before lifting. Finally, a user can "back-up" to a previous menu by pointing to its center 44.

Figure 5:
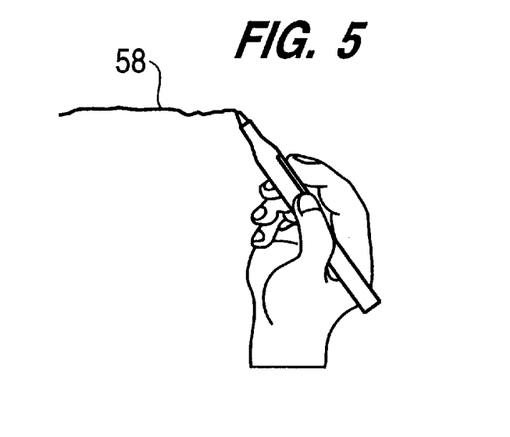
FIG. 5 depicts selection using a marking pattern without producing a display.

Another, faster, way to make a selection without popping up the menu is by drawing a mark 58 as illustrated in FIG. 5. A mark can be drawn by pressing the pen down and immediately moving. The direction of the mark 58 dictates the particular item selected from the menu. In the present invention if only a mark is made, as will be discussed in more detail later, and the menu is not allowed to pop-up, the system interprets the mark as if the linear portion of the present invention does not exist. This is called the "marking" mode as opposed to the "menuing" mode when the combined marking and linear menu is displayed which will be discussed in more detail later.

Thus, marking menus allow items to be selected in two different ways. Using the method of FIG. 4 radial menus can be sequentially displayed and selections made. The method of FIG. 5 uses marking without menu display to make the same selection. The first method is good when the user is unfamiliar with the menu. The second method is good when the user is familiar with the menu and wants to avoid waiting for the display of the menu.

Marking menus avoid some of the problems of hot keys. A user does not have to remember the association between keys and menu items. The user only needs to remember the spatial layout of menu items. Typically users very quickly learn the spatial location of menu items, especially for frequently used commands. Marking menus also do not require a keyboard for operation. However, because human capability is limited in the accuracy in which angles can drawn, the number of menu items in marking menus is generally limited to eight items.

In many situations modern user interfaces use menus with more than eight items. For example, the number of items in pop-up menus in the ALIAS V6 package ranges from 8 to 15 items, with an average of 12.75 items per pop-menu. Higher number of items can be used in marking menus by making the menus hierarchic. In this case rapid menu selection requires a zig-zag type line with pauses rather than just a simple stroke. For example, a 64 item menu can be made up of an eight item menu where each item leads to another eight item submenu. Thus, if a user interface designer wishes to convert an application which uses linear menus into one which uses marking menus, the designer must convert any menu that takes more than eight items into an hierarchic menu. This conversion process requires extra work and linear menu items may not decompose naturally into hierarchic categories.

Figure 6:
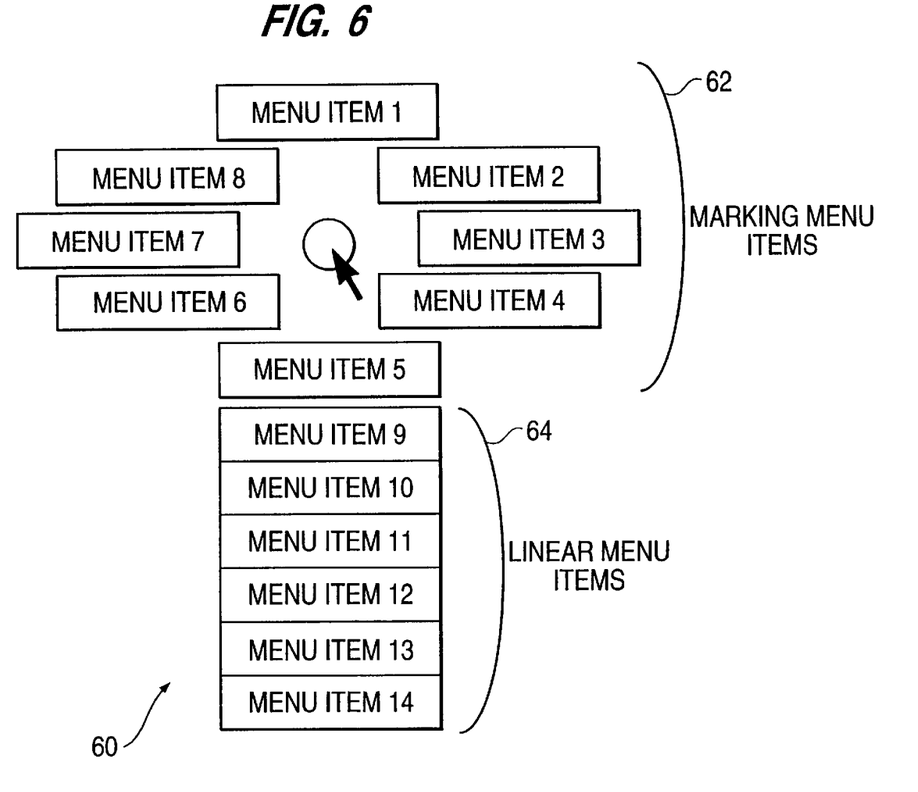
FIG. 6 shows a combined radial marker and linear menu according to the present invention.

The present invention combines marking menus and linear menus into a single menu 60, as illustrated in FIG. 6, such that converting linear menus into a marking menu does not require the decomposition of menu items into categories. In the invention up to the first eight items of the traditional linear menu that are the most highly selected are mapped directly to a marking menu portion 62. The additional ("overflow") items are mapped to a linear menu portion 64, which is displayed at the same time the marking menu portion 62 is displayed. The linear portion 64 is shown below the marker portion 62, however, the linear portion position can be varied as desired as long as it appears simultaneously on the same display.

The present invention, as depicted in FIG. 6, has the following advantages. First, as stated before, conversion of linear menus to this format is simple. No decomposition into hierarchic categories is needed and more than eight item per menu can be used. Second, accelerated selection can be performed on the first eight items, such that time savings can be realized over traditional linear menus. Third, because some of the items in the menu 60 are laid out side by side as opposed to top to bottom, the overall height of menu 60 is reduced. Finally, this type of menu 60 takes up approximately the same screen space as a tradition linear menu and therefore this new menu 60 can be displayed at the same location as tradition linear menus (for example, the menu can be pop-up or pop-down, etc.).

The invention has some characteristics different from traditional linear menus. First, the user must pause to display the menu before selecting an item from the linear portion 64 of the menu. This is not a great disadvantage since these items are by definition supposed to be infrequently used commands. If the position where the menu pops-up is very close the edge of screen there may not be enough room to select some of the items from the radial portion 62 of menu using a flick. For example, suppose the menu 60 pops up when a user presses the mouse button down right in the top left corner of the screen. At this point there is no room to "flick" the cursor up or to the left to select some of the menu items. In practice, this is not a serious problem since there are very few situations where a menu is popped up right along the edge for the screen. Also, the amount of room needed for a flick can be very small. Finally, the radial portion 62 of menu 60 represents a grouping of menu items that is based on frequency of selection. In linear menus, items are generally grouped together based on function. Therefore, the conversion to this new menu system might require rearrangement of items in a menu. Fortunately, the particular grouping of menu items has little value once a user becomes familiar with a menu layout and therefore this is not a serious problem in the long run.

Figure 7:
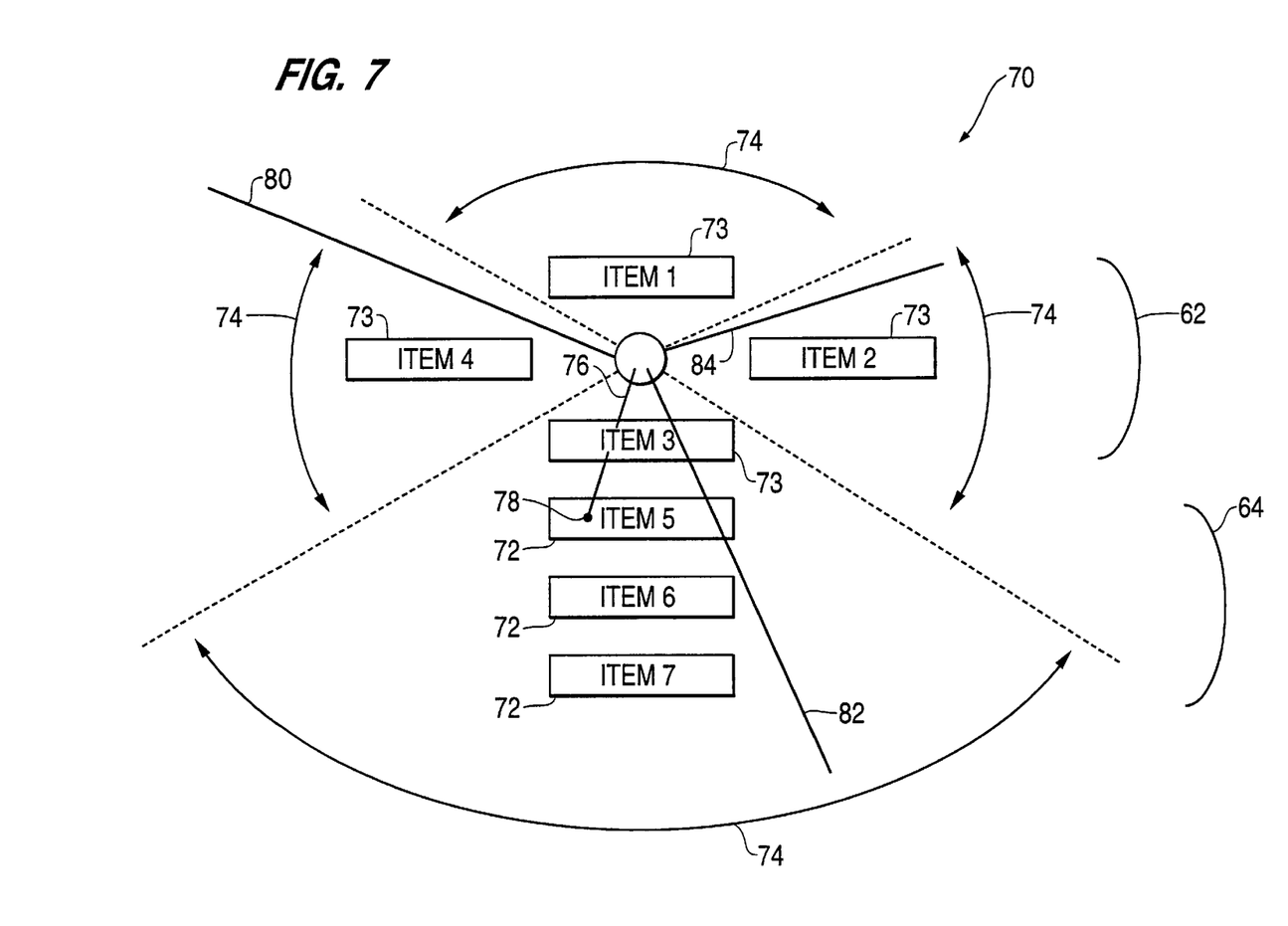
FIG. 7 illustrates selection operations of the invention.

The creation of such a combined menu requires that a displayed menu 70, as illustrated in FIG. 7, be divided into different regions. In the linear region which is defined by each of the areas of the individual menu items, "display buttons" or selection regions 72 are defined. In the marking region, which is all of the display outside the display buttons 72 and 73, the selection regions are defined by angular ranges 74. During operation if a stroke or mark, such as stroke 76, has an end point 78 that is within a linear selection region 72 or within a label 73 (and the pen is lifted at that point), the item of the end point 78 is selected which in this example is Item 5. If a stroke 80 is in a region of the marking menu portion, the item selected is the item of the coinciding range or wedge which in this particular example is Item 4. If a stroke 82 ends in a marker region 74 after crossing one or more linear regions 72, the item selected is the item of the coinciding wedge or marker region which in this particular example is Item 3. That is, whenever the end point of the stroke does not lie within a linear region 72 (or label 73), the coinciding or corresponding marker region item is selected. A radial menu label can fall outside an angular range associated with that label, however, pointing to a menu item overrides the angular ranges. For example, a portion of Menu Item 2 (the area of the label for Item 2) in FIG. 6 can lie, depending on how the angular ranges of each item are defined, in the angular range for Menu Item 3. However, pointing directly to the label of Menu Item 2 will highlight it even if the pointer is in the angular range of Menu Item 3. Linear menu items, such as 72 in FIG. 7, have no "angular range" features and the user must position the pointer directly over the label for the item to be selected.

The invention behaves differently from the description above when the user does not display the menus but draws a mark. In this case, the mark is interpreted as if the linear menu items do not exist. For example, if a mark like 76 were drawn this would not result in the selection of linear menu item 5, but in radial item menu 3. This has the advantage that a user can quickly select radial menu items with a quick mark (a "flick") without accidently selecting linear menu items.

The present invention is directed to the combination of radial menus and linear menus in the same display. If the invention were to follow the typical rules for menu selection in the prior art this would mean that all menu selections (either by displaying a menu or by drawing a mark) would be based on the location of the cursor at the end of the stroke. This in turn would result in selection errors when a user tries to select from the menu of the present invention quickly. Thus, the advantage and distinction of the present invention is apparent.

The operation of the process of determining the selection is illustrated in the flowcharts of FIGS. 8–11. Typically such a process is interrupt driven with interrupts occurring based on an interrupt timer or based on events, such as the depression/release of a mouse button or the detection of mouse movement. As can be seen from a visual review of FIGS. 8–11 the operations performed begin with an exit from a wait state 120 and return to this state 120. The exit from the wait state is caused by an event, which event is checked to determine the type of event as discussed in more detail below. The operations can generally be broken into pen-down—FIG. 8, pen—drag FIG. 9, pen-still—FIG. 11 and pen-up FIG. 11.

Figure 8:
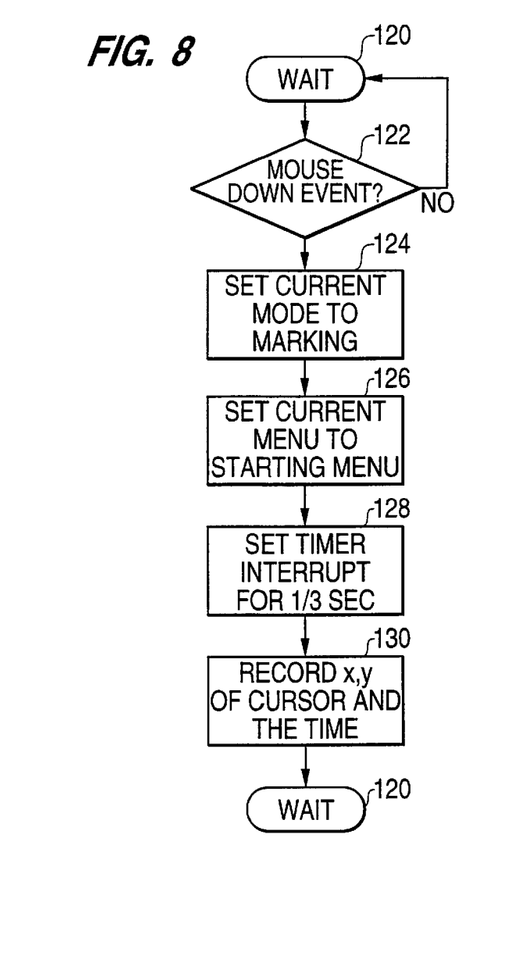
FIGS. 8–11 comprise flowcharts of the steps of the present invention.

The pen-down operation of FIG. 8 first checks 122 to determine whether the mouse button down event has occurred. If not, the system returns to the wait state 120. Otherwise, the mode is set 124 to the marking menu mode and the menu selection is set 126 to the starting or highest menu in a hierarchy. A system timer is then set 128 to ensure that the system detects that the pen/mouse is no longer moving or is still. The current position of the cursor and the time are then recorded 130.

Figure 9:
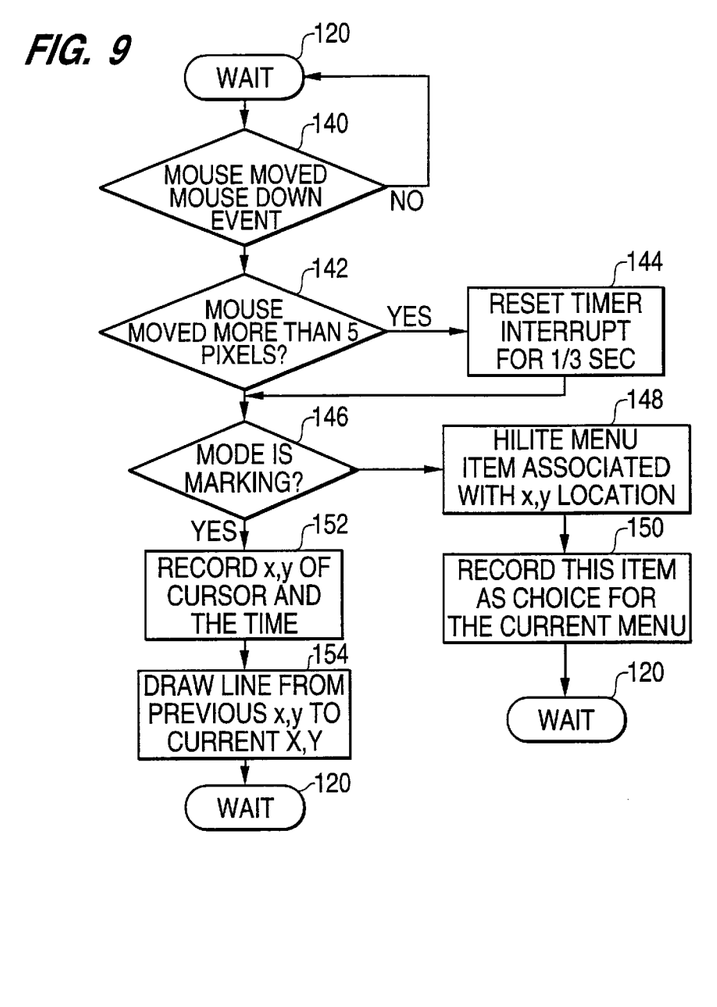
Figure 10:
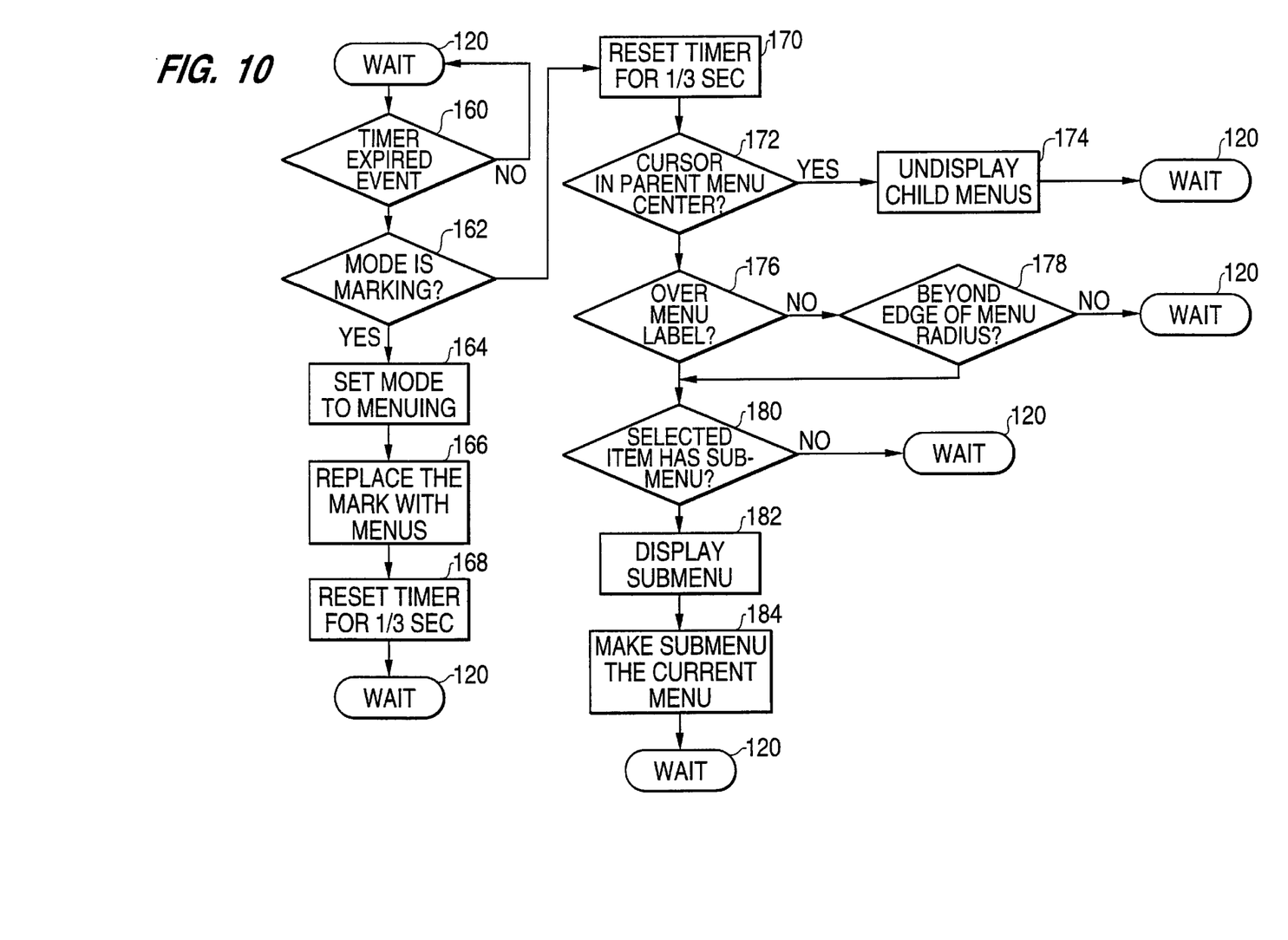

In the pen-drag operation the first check performed, as depicted in FIG. 9, is to determine 140 whether the event of the mouse moving while the button is down has occurred. If not, again the system returns to the wait state 120. If so, a check 142 is made of the distance of movement of the cursor or pointer against a movement threshold. If the threshold has been exceeded the timer is reset 144. In both cases the next step is a determination 146 concerning the mode. If the mode is not the marking mode, the item of the particular location of the cursor or pointer is highlighted and the item is recorded 150 as the current choice. If the mode is the marker mode, the current cursor location and the time is recorded.

In the pen-still operation (FIG. 10), the first check 160 is to determine whether the timer event has occurred, if not, the wait state 120 is entered. In this operation the system also checks 162 on the mode. In the marker mode the mode is set 164 to the menu mode and the mark is replaced 166 by the appropriate menus as previously discussed. The time is then set 168 and the wait state is entered. When not in the marker mode, the system sets 170 the timer and determines 172 whether the cursor is in the center of the parent menu. If so, the child menu is removed 174 from the display. If not in the center of the parent menu, a determination 176 is made as to whether the position is over a label menu item. If not, a determination 178 is made as to whether the cursor is beyond the edge of the radial menu. If it is beyond the edge, a determination 180 is then made as to whether the item has a submenu. If a submenu exists for the item, the submenu is displayed 182 and the submenu is made 184 the current menu.

Figure 11:
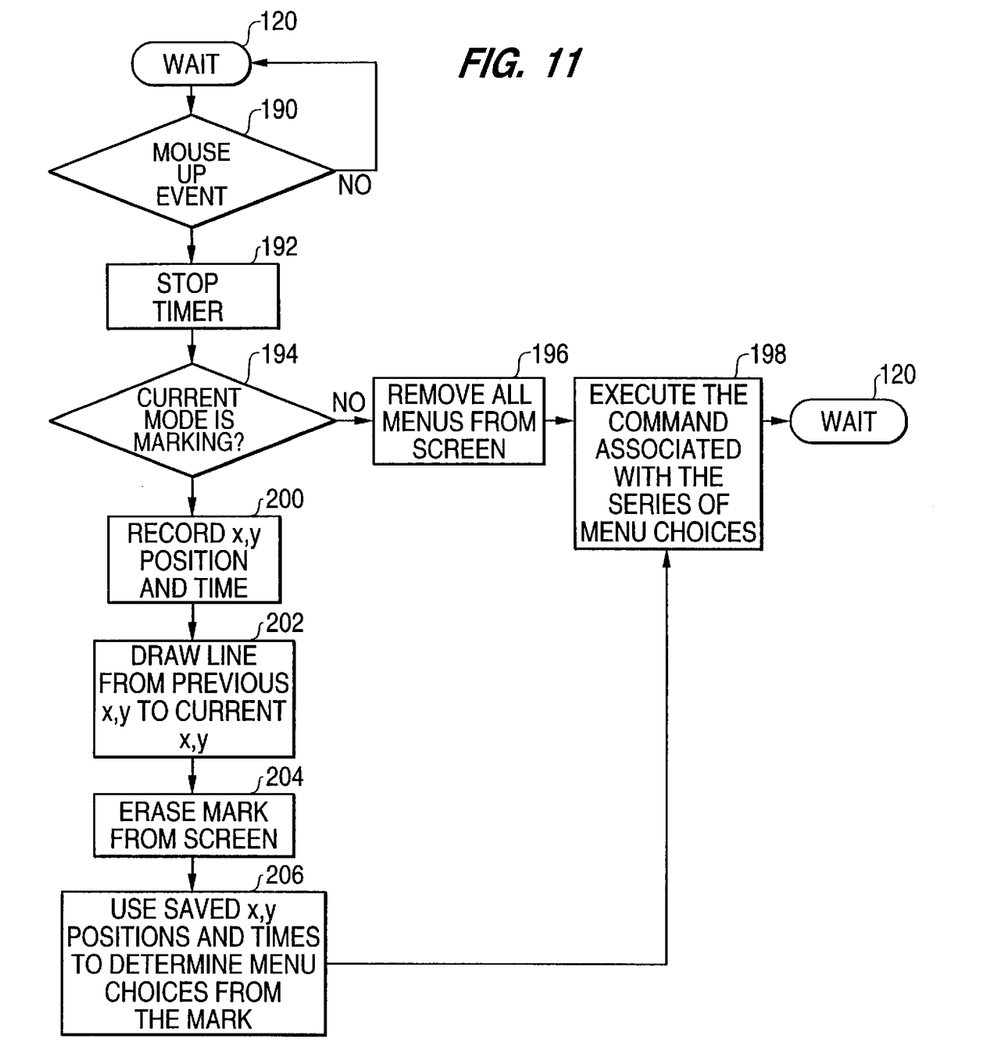

The pen-up operation as depicted in FIG. 11 performs the item selection determination. The system determines 192 whether the mouse button up event has occurred and if it is up, stops 194 the timer. If the current mode is determined 194 not to be the marking mode, the menus are all erased 196 and the selection is made 198 based on the recorded menu choices. If the mode is the marker mode, the current cursor position and time is recorded 200. A line is then drawn 202 from the between the previous and current cursor positions. The mark is then erased 204, the saved positions and times are used to determine 206 the menu choices from the mark and the selection is executed 198.

It is important that an implementation take certain characteristics of typical window operating systems, with which the invention is typically used, into account as well as accounting for how such operating systems interface with applications. One problem is that many operating systems do not issue an event when a cursor or pointer moved by a pointing device stops moving and the velocity drops to zero. Another problem is that some systems will not relinquish control unless an interrupt is generated. As a result, for such systems the implementation must include a provision for periodically sampling pointing device (cursor) position, such as by including timer interrupts, so that the various steps discussed above will work properly. Some operating systems do not include provisions for saving a portion of a screen into which a menu such as that of the present invention is "popped." In such systems the implementation needs to provide for saving and restoring the portion of the display over written by the pop-up menu when or after the particular selection by the user is made. Because of such problems it is preferred that the invention be implemented in an XWINDOWS system, such as available from Silicon Graphics, Inc.

Additional details concerning the preferred implementation of the process depicted by FIGS. 8 and 11 are set forth in pseudocode included herein as an Appendix. It is preferred that the process as described herein be implemented in a language such as C. However, any language suitable for user interface display generation and processing with a pointing device can be used.

Figure 12:
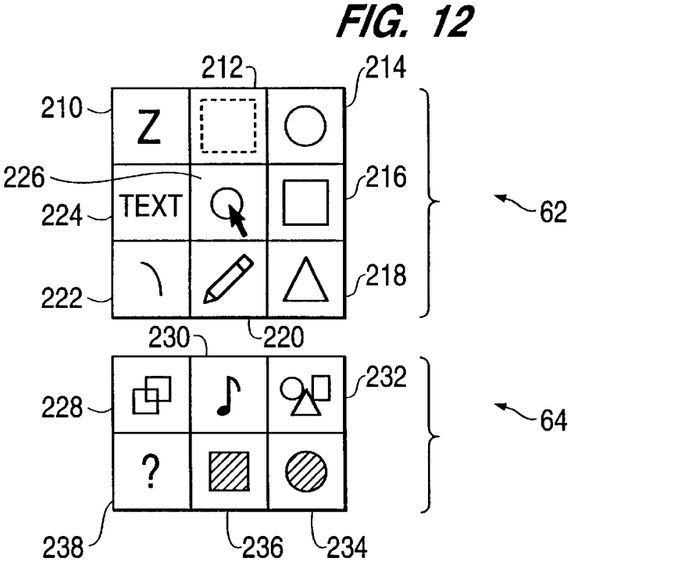
FIGS. 12 and 13 depict an icon menus and expansion thereof from a tool pallet.

The invention has been described with respect to examples that depict menus with text labels. However, in many cases the preferred mode of display is to use icons. An example of an icon menu that includes radial as well as linear menu items that are arranged in a three-column array is illustrated in FIG. 12. In this example eight icons 210–224 are shown in the marking menu portion 62 arranged around a center 226 at which a pointer is located. The linear or location selection portion 64 includes six icons 228–238. This menu is selected in the same way as the text label menu previously described with the user being required to understand the meaning of the icons. The linear menus can be arranged in a two dimensional arrangement as shown in FIG. 12 and the linear menu can be arbitrarily located at any location around the radial menu that is desired depending on where the radial menu actually pops up, something generally decided in the original design of the menu.

Figure 13:
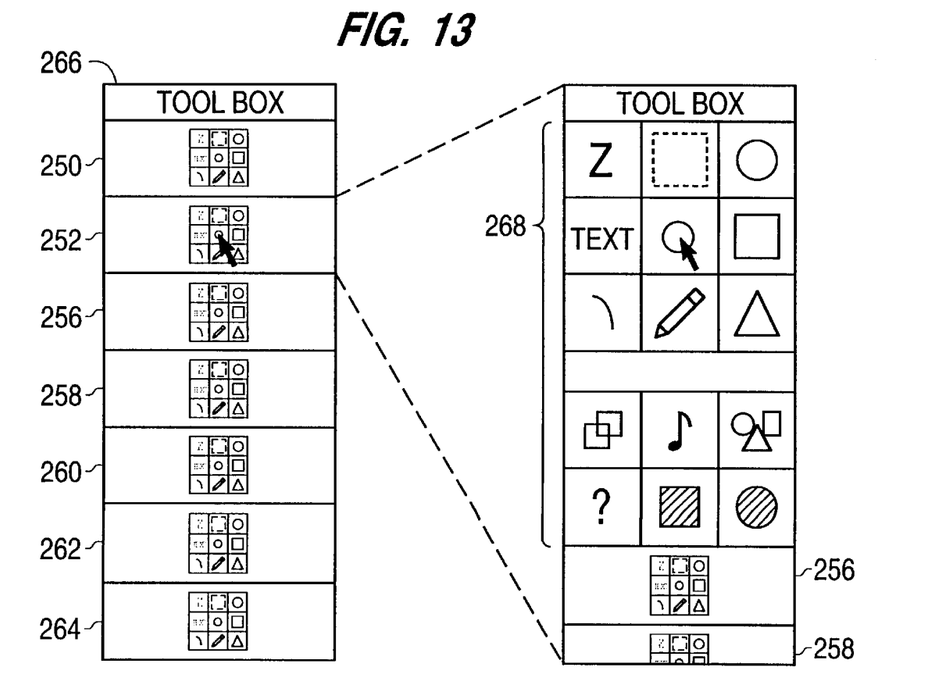

FIG. 13 illustrates icon sets 250–264 of a tool box 266 and the expansion of the tool pallet 268 of a selected one of the tool sets 252 with the pointer being positioned at the center of the pallet when expanded allowing continued marking or location dependent selections from the center of the pallet. This illustrates that the pallet can be expanded from a small and generally hard to decipher icon display representation. In addition, the marking selection process can be used to select icons from the small representations of the icons on the left in this figure even when the icons have not been popped-up or expanded to full size, when they might not be "readable" and when the user would have to remember which icon represented which selection.

The menu items shown and discussed herein have included text labels and icons, however, other types of menu items such as moving pictures, symbols, sound, etc. can be substituted. The invention can also be used with any type of menu in a variety of contexts, such as a tool pallet, pulldown menu and object hot spots. The stroke or "link trail" or "rubber band line" also need not be displayed. The number of items in each portion of the menu can vary and the items can be in any desired arrangement.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

---

Marking menus with overflow items pseudo-code algorithm.
Assumed system configuration:
Assume we have an event based input system. Three types of events are reported to the application:
1) the mouse button being pressed down
2) the mouse location changing when the mouse button is down
3) the mouse button being released
Assume we have a system capable of scheduling timer interupts with at least a 1/10 of a second frequency.
When events of type 1, 2 and 3 occur the procedures MMpendown, MMpendrag, MMpenup are respectively called. The current mouse x, y location is passed into each of these procedures. When a timer interupt occurs a procedure called MMpenstill is called.
Notes on pseudo-code coventions:
If a subroutine is used more than once, its first occurence in the pseudo code consists of an english description followed by a name for the procedure in brackets. Subsequent uses of the subroutine simply -continued use its name.
Some pseudo-code lines are high-level descriptions of more complicated
subroutines. These lines may be followed by a name for the routine in
brackets. A more detailed pseudo code description for the routine is
given later.
Notes of variables. PAUSETIME is a length of time user must
hold the mouse still to trigger the display of the menu. In practice
PAUSETIME is approximately 1/3 second. JITTEROTERANCE is the amount
the mouse can move, in pixels, before our algorthm considers the
mouse to no longer be still. In practice JITTERTOLERANCE is
approximate 5 pixels.
Comments for explanation are enclosed in by "[ ]"
MMpendown(x, y)
    Set the current mode to be MARKING
    Set the current menu to be the root or starting menu
    Schedule a timer interrupt in PAUSETIME (Starttimer)
    Record x, y position as first point in the mark,
        and time this position occured
MMpendrag(x, y)
    if the x,y position has moved a "significant amount" in from
        its last position (CursorMoved?)
        Upschedule the timer interrupt (Stoptimer)
        Starttimer
    if current mode is MARKING
        Save the x, y position, and the time this position occured
        Draw a line segment from previous x,y location to the
            current x,y location
    else
        Hilite the menu item which is associated with the x,y
            location (MenuChoice)
        Record this menu item as being the choice for the current menu.
MMpenstill
    if current mode is MARKING
        Stoptimer
        Set the current mode to MENUING
        replace the mark with menus (ReplaceMark)
        StartTimer
    else
        Stoptimer
        Starttimer
        if current position is in a parent menu center
            Undisplay submenus till you reach the parent menu
                whose center is being pointed to
        else if the current x,y position is over a menu label or
                beyond the edge of the current menu radius
                and the currently selected menu item has a submenu
            Display the submenu of the currently selected item
            Make the submenu the current menu
MMpenup(x, y)
    Stoptimer
    if current mode is MARKING
        Save the x, y position
        Draw a line segment from previous x,y location
            to the current x,y location
        Remove all drawn line segments from the screen
        Use the saved x,y positions to determine the menu
            choices associated with the mark (SelectionfromMark)
    else
        Remove all the displayed menus from the screen
    Execute the menu choices
MenuChoice
    if the cursor is directly over one of the menu item labels [check both
        the radial portion of the menu and the overflow portion]
        [this step is critical to the algorithm. It makes selection
        when the menu is displayed behave differently from selection
        by drawing a mark. See comment *** below for how selection by
        a mark is determined]
    then the menu choice is that menu item
    else if the cursor is in the center of the radial menu
    then there is no menu choice
    else the choice is the menu item assoicated with the radial
        wedge the cursor is in.
SelectionFromMark
    if the mark is very small (length < size of the center graphic)
    then no selection was made
    if the menu structure is only 1 level deep
    then using the starting point of the mark and the ending point
        determine which radial wedge the endpoint is in. The item
        associated with that wedge is the choosen item
    else -continued

```
                Determine bends and pauses along the marks that
                        correspond to possible transitions from menu selections
                        to submenu selections (GetArticulationPoints)
                From this series of points determine the series of menu item
                        selections made based on the radial wedges only [ *** this
                                is the key to algorithm: marks are analyzed as if
                                no overflow items are present in the menus]
GetArticulationPoints
        Using the list of points and times recorded as the mark was being made,
                find points where the user paused for at least 1/2 second.
        if the number of pause points is greater than the maximum depth the
                menu structure consider the mark a scribble and return no
                articulation points.
        if there are less pause points than the maximum menu depth + 1
                Find the angle changes along the mark that are greater
                        than 22.5 degrees [22.5 degrees is 1/2 of 45 degrees which
                                is the angular differences between adjacent wedges.
                                Therefore a change of at least 22.5 degrees in line
                                direction indicates the user meant to select from
                                different wedge in a submenu]
                Use the first maximum menu depth-1 of them as the
                        articulation points
ReplaceMark
        GetArticulationPoints
        For each articulation point deterime the series of menu items
                selection based on radial wedge only
        Display those menus each centered at the corresponding
                articulation points
CursorMoved?
        return True if ABS(previous x location – current x location) +
                        ABS(previous y location – current y location)
                        >JITTERTOLERANCE
```

What is claimed is:

1. A display, comprising:

a radial menu displaying radial menu items from which a selection can be made; and a linear menu simultaneously displayed with said radial menu having menu items non-hierarchically related to the radial menu items, and said radial and linear menus being simultaneously produced and displayed based on a single input event.

2. A display, comprising:

a radial menu having plural radial menu items from which a selection can be made; and a linear menu simultaneously displayed with said radial menu, having linear menu items non-hierarchically associated with said radial menu items where a number of linear menu items corresponding to the radial menu items is at least one and less than a total number of the radial menu items, and said radial and linear menus being simultaneously produced and displayed based on a single input event.

* * * * *

UNITED STATES PATENT AND TRADEMARK OFFICE
CERTIFICATE OF CORRECTION

PATENT NO.: 5,926,178
DATED : July 20, 1999
INVENTOR(S): Gordon P. KURTENBACH

It is certified that error appears in the above-identified patent and that said Letters Patent is hereby corrected as shown below:

Col. 8, line 37, change "link trail" to --ink trail--.

Signed and Sealed this

Eighth Day of February, 2000

Attest:

Q. TODD DICKINSON

Attesting Officer

Commissioner of Patents and Trademarks